(12) United States Patent
Tan (10) Patent No.: US 9,152,907 B2
(45) Date of Patent: Oct. 6, 2015

(54) METHOD AND MEMORY CARD FOR WIRELESS DIGITAL CONTENT MANAGEMENT (75) Inventor: Wayne Joon Yong Tan, Singapore (SG)

(73) Assignee: T-DATA SYSTEMS (S) PTE LTD., Singapore (SG)

( * ) Notice: Subject to any disclaimer, the term of this patent is extended or adjusted under 35 U.S.C. 154(b) by 210 days.

(21) Appl. No.: 12/863,554

(22) PCT Filed: Aug. 12, 2009

(86) PCT No.: PCT/SG2009/000279
§ 371 (c)(1),
(2), (4) Date: Apr. 28, 2011

(87) PCT Pub. No.: WO2010/027330
PCT Pub. Date: Mar. 11, 2010

(65) Prior Publication Data
US 2011/0242335 A1    Oct. 6, 2011

(30) Foreign Application Priority Data

Sep. 4, 2008   (WO) ............... PCT/SG2008/000327

(51) Int. Cl.
*H04N 5/225*       (2006.01)
*G06K 19/07*       (2006.01)
*H04N 1/00*        (2006.01)

(52) U.S. Cl.
CPC ........ *G06K 19/0723* (2013.01); *H04N 1/00175* (2013.01); *H04N 1/00193* (2013.01); *H04N 1/00251* (2013.01); *H04N 5/225* (2013.01);
(Continued)

(58) Field of Classification Search
CPC ... H04N 5/225; H04N 1/00175; G06K 19/07; G06K 19/0273
USPC ...................................................... 348/207.1
See application file for complete search history.

(56) References Cited

U.S. PATENT DOCUMENTS 6,055,442 A    4/2000  Dietrich
6,296,191 B1   10/2001 Hamann et al.
(Continued)

FOREIGN PATENT DOCUMENTS

CN         1770768 A      5/2006
CN       101110656 A      1/2008
(Continued)

OTHER PUBLICATIONS

Chinese First Office Action dated Jul. 26, 2011 as received in corresponding Chinese Application No. 200980100887.9, 5 pages.
(Continued)

*Primary Examiner* — Nicholas Giles
*Assistant Examiner* — Abdelaaziz Tissire
(74) *Attorney, Agent, or Firm* — Foley & Lardner LLP (57) ABSTRACT

A memory card is described, the memory card having a wireless transceiver module, a central processor, and a storage module. The memory card when physically and operably engaged in and with a digital camera, is configured to export digital data captured by the digital camera to a remote camera through the wireless transceiver module in response to an instruction received by the central processor from an inbuilt processor of the digital camera, and receive digital data from the remote camera through the wireless transceiver module in response to an instruction received by the central processor from the inbuilt processor.

15 Claims, 4 Drawing Sheets

(52) U.S. Cl.
CPC .. *H04N 2201/001* (2013.01); *H04N 2201/0013* (2013.01); *H04N 2201/0015* (2013.01); *H04N 2201/0032* (2013.01)

(56) References Cited

U.S. PATENT DOCUMENTS

| | | | |
|---|---|---|---|
| 8,176,230 B2 | 5/2012 | Chen et al. | |
| 2001/0022624 A1* | 9/2001 | Tanaka et al. | 348/333.02 |
| 2002/0052219 A1* | 5/2002 | Hamamura | 455/557 |
| 2002/0174337 A1* | 11/2002 | Aihara | 713/172 |
| 2003/0074179 A1* | 4/2003 | Ropo et al. | 703/27 |
| 2003/0079096 A1* | 4/2003 | Murakami | 711/156 |
| 2003/0128272 A1* | 7/2003 | Clough et al. | 348/14.02 |
| 2003/0133015 A1* | 7/2003 | Jackel et al. | 348/207.1 |
| 2003/0135731 A1 | 7/2003 | Barkan et al. | |
| 2004/0127254 A1* | 7/2004 | Chang | 455/557 |
| 2004/0219949 A1* | 11/2004 | Su et al. | 455/558 |
| 2004/0250037 A1 | 12/2004 | Takemura et al. | |
| 2005/0021983 A1 | 1/2005 | Arnouse | |
| 2005/0156737 A1* | 7/2005 | Al-Khateeb | 340/541 |
| 2005/0166077 A1 | 7/2005 | Reisacher | |
| 2006/0000914 A1 | 1/2006 | Chen | |
| 2006/0039221 A1* | 2/2006 | Fukuda | 365/222 |
| 2006/0056326 A1* | 3/2006 | Croome | 370/315 |
| 2006/0246840 A1* | 11/2006 | Borowski et al. | 455/41.2 |
| 2006/0258389 A1 | 11/2006 | Saito et al. | |
| 2007/0015589 A1* | 1/2007 | Shimizu et al. | 463/43 |
| 2007/0030357 A1* | 2/2007 | Levien et al. | 348/211.14 |
| 2007/0073937 A1* | 3/2007 | Feinberg et al. | 710/62 |
| 2007/0242822 A1 | 10/2007 | Hamada | |
| 2008/0102766 A1 | 5/2008 | Schultz | |
| 2008/0195797 A1* | 8/2008 | Sherman et al. | 711/103 |
| 2008/0233870 A1 | 9/2008 | Budde | |
| 2009/0193514 A1 | 7/2009 | Adams et al. | |
| 2009/0256684 A1 | 10/2009 | Fukuda | |
| 2010/0115200 A1* | 5/2010 | Papagrigoriou | 711/115 |
| 2010/0201845 A1* | 8/2010 | Feinberg et al. | 348/231.99 |
| 2010/0328493 A1* | 12/2010 | Hanlon et al. | 348/231.9 |
| 2011/0004840 A1* | 1/2011 | Feinberg et al. | 715/772 |
| 2011/0025858 A1* | 2/2011 | Elazar et al. | 348/207.1 |
| 2011/0145464 A1* | 6/2011 | Tan | 710/301 |
| 2011/0314068 A1 | 12/2011 | Sherman et al. | |
| 2012/0068850 A1* | 3/2012 | Ito | 340/669 |
| 2012/0242845 A1* | 9/2012 | Tan | 348/207.1 |

FOREIGN PATENT DOCUMENTS

| | | |
|---|---|---|
| EP | 1 875 757 B1 | 1/2008 |
| JP | 2002-009690 A | 1/2002 |
| JP | 2004-310557 A | 11/2004 |
| JP | 2005-252552 A | 9/2005 |
| JP | 2005-323220 A | 11/2005 |
| JP | 2006-041873 A | 2/2006 |
| JP | 2006-113719 A | 4/2006 |
| JP | 2006-128892 A | 5/2006 |
| JP | 2006-245748 A | 9/2006 |
| JP | 2007-288254 A | 11/2007 |
| KR | 10200569914 | 7/2005 |
| TW | 200828124 | 12/1995 |
| TW | 200828124 A | 7/2008 |
| WO | WO-2006/117009 A1 | 11/2006 |

OTHER PUBLICATIONS

Chinese Notification of First Office Action dated Mar. 27, 2012 as received in corresponding Chinese Application No. 200980100916. 1, 19 pages.
English translation of Korean Office Action dated Jan. 18, 2012 as received in corresponding Korean Patent Application No. 10-2010-7009130, 5 pages.
European Extended Search Report dated Dec. 9, 2011 as received in corresponding European Application No. 09811782.3, 8 pages.
International Preliminary Examination Report received in corresponding PCT Application No. PCT/SG2009/000280, dated Mar. 17, 2011, 7 pages.
International Search Report and Written Opinion as received in PCT/SG2009/000280 dated Oct. 26, 2009, 7 pages.
Japanese First Office Action dated Apr. 20, 2012 as received in corresponding Japanese Application No. 2010-530964, 4 pages.
International Preliminary Report on Patentability for PCT/SG2009/00279, dated Dec. 23, 2010, 13 pages.
International Preliminary Report on Patentability dated Jul. 13, 2009 as received in corresponding PCT Application No. PCT/SG2008/000327, 7 pages.
International Search Report and Written Opinion dated Nov. 13, 2008 as received in corresponding PCT Application No. PCT/SG2008/000327, 7 pages.
United Kingdom Examination Report dated Mar. 5, 2012 as received in corresponding United Kingdom Application No. GB1005503.6, 2 pages.
"Eye-Fi Unveils World's First Wireless Memory Card" Press Release; Eye-Fi, Inc.; Mountain View, CA; Oct. 30, 2007.
US Office Action dated Jun. 19, 2012, as received in corresponding U.S. Appl. No. 12/863,556, 20 pages.
Japan First Office Action dated Jul. 10, 2012 as received in corresponding Japan Application No. 2010-530967.
Koichi Sakurai (translation supervisor), "Basis of Cryptographic Theory", Kyoritsu Shuppan Co., Ltd., Nov. 1, 1996, 1st ed., pp. 290-293.
US Office Action dated Sep. 21, 2012 as received in corresponding U.S. Appl. No. 12/863,547.
International Search Report corresponding to PCT/SG2009/000279, dated Oct. 20, 2009, 2 pages.
PCT Written Opinion corresponding to PCT/SG2009/000279, dated Oct. 20, 2009, 7 pages.
US Office Action received in connection with U.S. Appl. No. 12/863,556 DTD Nov. 1, 2012.
User's Manual-D80-Guide to Digital Photography; website URL: <http://support.nikonusa.com/app/answers/detail/a_id/14051; published Aug. 11, 2006.
Notice of Allowance received in connection with U.S. Appl. No. 12/863,556; dtd Feb. 7, 2013DTD Feb. 7, 2013.
"The Guide to Digital Photography with the D80 Digital Camera", Nikon Corporation, Tokyo, Japan.
Nikon D80; Wikipedia Entry, accessed at URL <http://en.wikipedia.org/wiki/Nikon_D80> on Feb. 4, 2013.
English translation of a Japanese Office Action received in JP Appln No. 2010-530964; dtd Jan. 31, 2013.
Extended European Search Report in EP Appln No. 08794229.8; dtd Aug. 29, 2012.
Office Action in KR application No. 10-2010-7009130; dtd Oct. 22, 2012.
Search Report in corresponding European application No. 09 811 781.5 dated Nov. 25, 2014, 8 pages.
http://photojojo.com/store/awesomeness/eye-fi-wifi-memory; "Eye-Fi Gives Any Digital Camera Wi-Fi and Geo-Location!"; Eye-Fi Wireless Camera SD Memory at The Photojojo Store, Jul. 1, 2007, 9 pages.

* cited by examiner

METHOD AND MEMORY CARD FOR WIRELESS DIGITAL CONTENT MANAGEMENT

CROSS-REFERENCE TO RELATED APPLICATIONS

This is a National Stage application of PCT/SG2009/000279, filed Aug. 12, 2009, which claims the benefit and priority of International Application PCT/SG2008/000327, filed Sep. 4, 2008. The foregoing applications are incorporated by reference herein in their entirety.

TECHNICAL FIELD

This invention relates to a method and memory card for wireless digital content management and refers particularly, though not exclusively, to such a method and memory card using a wireless media for enabling a digital camera to communicate wirelessly.

BACKGROUND

Digital cameras must be physically and electrically connected to a host computer to enable downloads and uploads of digital content. The digital content may be, for example, images, video images, marketing material, music content, and so forth. The application to manage and control uploads and downloads resides in the host computer. This is not always convenient.

This is because the digital camera has a processor that is incapable of independently exporting digital data captured by the digital camera. The digital camera requires a connection with the host computer to and the host computer imports the digital data captured by the digital camera, and the host computer exports digital data from the host computer to the digital camera. For all relevant functions the host computer controls the process. Alternatively, a memory card or similar non-volatile memory of the digital camera may be removed and inserted into the host computer for the digital data stored in the memory card to be uploaded to the host computer. Once stored in the host computer's memory, the digital data can be uploaded to a web site. For example, there are many web sites allowing the storing of personal photographs—"FaceBook" and "U-Tube" being but two of many examples. This requires access to a host computer for uploading to take place. This may not always be convenient.

SUMMARY

In accordance with a first exemplary aspect there is provided a memory card configured to be used in a digital camera having an inbuilt processor incapable of independently exporting digital data externally of the digital camera or independently importing digital data from externally of the digital camera. The memory card comprises a wireless transceiver module being operably connected to at least one of a central processor, and a storage module; and is configured to receive the digital data transmitted to the digital camera and to export the digital data from the storage module. The central processor is configured to control at least one of the reception of the digital data by the digital camera, and the transmission of the digital data from the digital camera when the digital data is captured by the digital camera. The storage module is operably connected to the central processor and is configured to store at least one of the digital data captured by the digital camera, and the digital data received by the digital camera. At least one control button of the digital camera is able to be used to control the central processor when the memory card is physically and operably engaged in and with the digital camera and the digital camera is in a predefined mode. The memory card is configured to at least one of export the digital data to a wireless network location through the wireless transceiver module in response to an instruction received by the central processor from the inbuilt processor of the camera, and receive the digital data from a remote image collection apparatus through the wireless transceiver module in response to an instruction received by the central processor from the inbuilt processor of the digital camera.

The memory card may be configured to detect potential wireless networks to which the memory card can be connected. The memory card may be configured to physically and operatively engage in and with the digital camera, and to operatively connect with the inbuilt processor; the operative connection being in the same manner as, and the inbuilt processor sees the memory card as, a normal memory card. The exporting and reception of the digital data may take place only when the digital camera is in the predefined mode. When the digital camera is in the predefined mode, the central processor may be configured to send a first index image file to the inbuilt processor for display of the first index image file on a screen of the digital camera. The first image index file may comprise a plurality of first menu items. Each of the plurality of first menu items may comprise an image. The first menu item selected may determine if the inbuilt processor is to be used to process the digital data, the processor and the wireless transceiver module are to be used to wirelessly export the digital data from the memory card, or the processor and the wireless transceiver module are to be used to wirelessly receive the digital data. The digital data may be selected from: image data, audio data, image and audio data, video data, and audio and video data. The memory card may comprise at least one address to which the processor and the wireless interface are to send the digital data or from which the processor and the wireless interface are to receive the digital data. The digital camera may be selected from: a digital camera, a digital video camera, a digital voice recorder, and a digital diary.

According to another exemplary aspect there is provided a method for at least one of: exporting digital data from or receiving digital data by a digital camera having an inbuilt processor incapable of independently exporting digital data externally of the digital camera or importing digital data from externally of the digital camera. The method comprises selecting a predetermined mode of the digital camera and sending a first index image file to the digital camera from a memory card installed in and operatively connected to the digital camera. The memory card has a central processor, a storage module and a wireless transceiver module. The first index image file comprises a plurality of first menu items. Each of the first menu items comprises an image. Control buttons of the digital camera are used to select one menu item from the first menu items. The one menu item selected determines if the inbuilt processor is to be used to process the digital data, the central processor and the wireless transceiver module are to be used to wirelessly export the digital data from the memory card, or the processor and the wireless transceiver module are to be used to wirelessly receive the digital data.

According to a further inventive aspect there is provided a method for exporting data from or receiving digital data by an digital camera having an inbuilt processor incapable of independently exporting data externally of the digital camera or importing digital data from externally of the digital camera.

The method comprises selecting a predetermined mode of the digital camera and the central processor sending a first index image file to the digital camera from the memory card. The first index image file comprises a plurality of first menu items. Control buttons of the digital camera are used to select one menu item from the plurality of first menu items. Upon an appropriate menu item being selected, the central processor and the wireless transceiver module wirelessly export the digital data from the digital camera or wirelessly import the digital data to the digital camera.

For the further aspect the digital camera may be used to capture digital data and store the digital data in a memory card installed in and operatively connected to the digital camera, the memory card having a central processor, a memory module and a wireless transceiver module.

For the other aspect, upon an appropriate menu item being selected, the central processor and the wireless transceiver module may wirelessly export the digital data from the memory card.

For the other and the further aspects, the memory card may physically and operatively engages in and with the digital camera. The memory card may operatively connect with the inbuilt processor in the same manner as, and the inbuilt processor sees the memory card as, a normal memory card. The control buttons of the digital camera may be able to be used to control the central processor only when the digital camera is in the predefined mode. The exporting of the digital data and the receiving of the digital data may take place only when the digital camera is in the predefined mode. The first index image file may be displayed on a screen of the digital camera. The digital data may be exported to or imported from at least one Internet address stored in the memory. The digital data may be exported to or imported from another digital camera having a memory card as described above. The digital data may be imported from a remote camera having wireless transmission capability. The remote camera may be a security camera. Upon the control buttons being used to select the one menu item of the first menu items, the inbuilt processor may send an instruction to the central processor. The instruction may contain an identifier of the one menu items. When the digital camera is in the predetermined mode and the one menu item is relevant for the wireless export or import of the digital data from the memory card, the central processor may treat the instruction as "select". When the digital camera is in the predetermined mode and the one menu item is relevant for the wireless reception of the digital data, the central processor may treat the instruction as "select". The instruction may be "delete".

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

Figure 1:
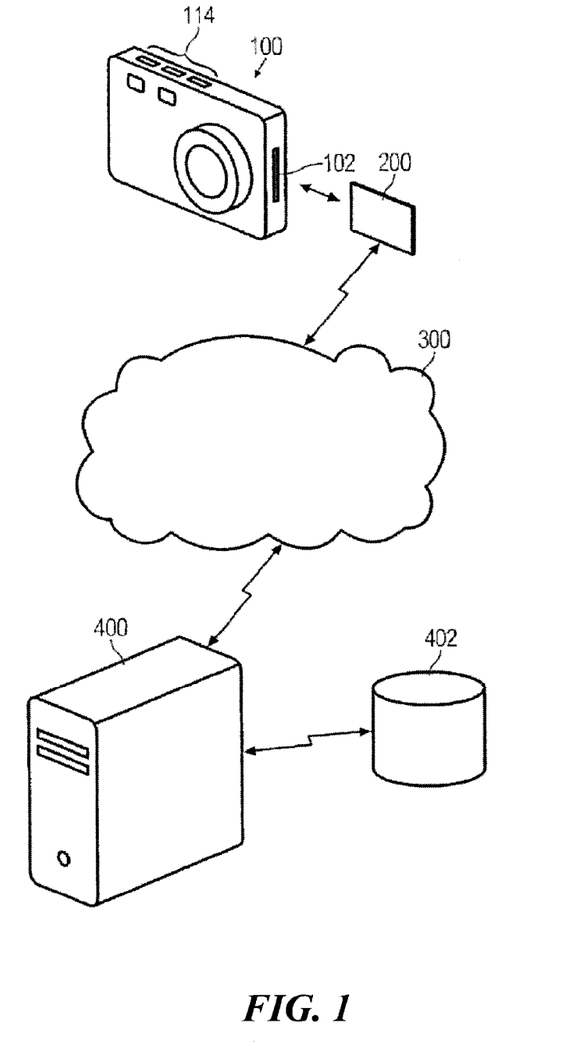
FIG. 1 is a schematic view of an exemplary system of a wireless media connectable to a host device to enable data captured from the host device to be transferred to a server wirelessly.

The exemplary embodiment is a method and digital camera to manage digital content for portable digital camera 100 via a wireless media. The portable digital camera 100 may be a digital camera, digital video camera, digital voice recorder, or digital diary. As shown, it is a digital camera. The digital camera 100 has a slot 102 into which a memory card 200 is inserted in the usual manner.

Figure 3:
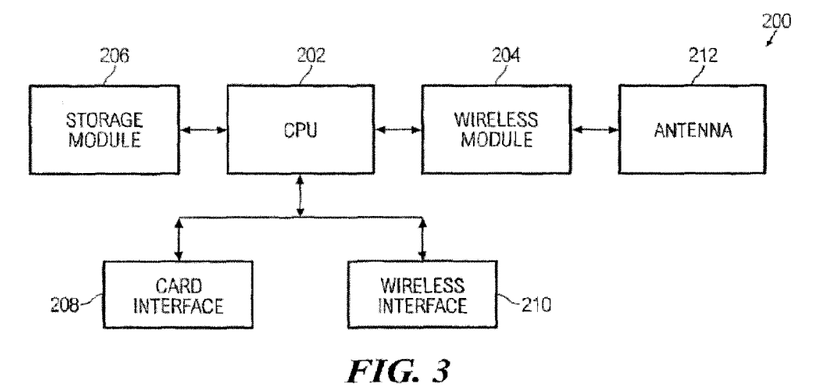
FIG. 3 is an illustration of the wireless media of FIG. 1.

The memory card 200 is shown in FIG. 3 and has a central processor 202, a wireless transceiver module 204 operatively connected to the central processor 202, and a storage module 206 operatively connected to the central processor 202. The central processor 202 has a card interface 208 as well as a wireless interface 210. The wireless transceiver module 204 also has an antenna 212.

Figure 4:
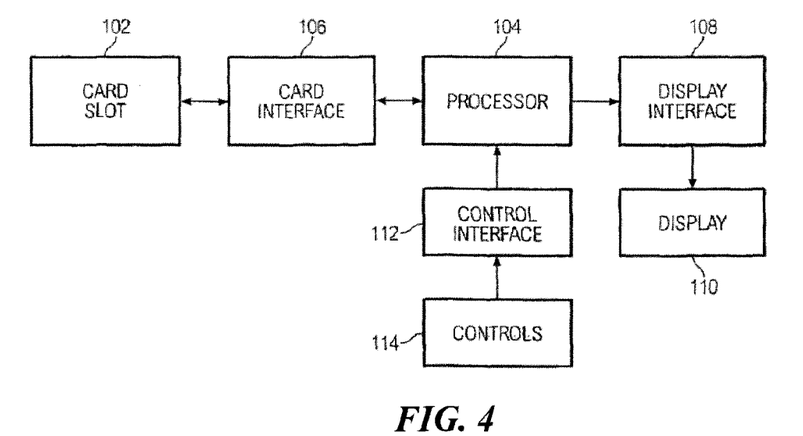
FIG. 4 is an illustration of the processor of the host device of FIG. 1.

The digital camera 100 has an inbuilt processor 104 with a card interface 106 for interfacing with the memory card 200 when inserted into slot 102. The inbuilt processor 104 also has a display interface 108 for controlling the display screen 110 of the camera 100. Furthermore, the inbuilt processor 104 has a control interface 112 for enabling the camera control buttons and so forth 114 to be used to control the operation of the camera 100. The inbuilt processor 104 is incapable of independently exporting digital data externally of the camera 100. By independently exporting it is meant that the processor 104 requires the camera 100 to be operatively connected to an intelligent host such as a computer that has the relevant operative software to enable the export of the data to the computer from the camera, the exporting being under the control of the computer. The normal operation of the camera 100 is under the control of the inbuilt processor 104.

The inbuilt processor 104 is also incapable of independently importing digital data from externally of the camera 100. By independently importing it is meant that the processor 104 requires the camera 100 to be operatively connected to an intelligent host such as a computer that has the relevant operative software to enable the export of the data to the camera from the computer (i.e. import of the data by the camera from the computer), the exporting/importing being under the control of the computer.

Figure 5:
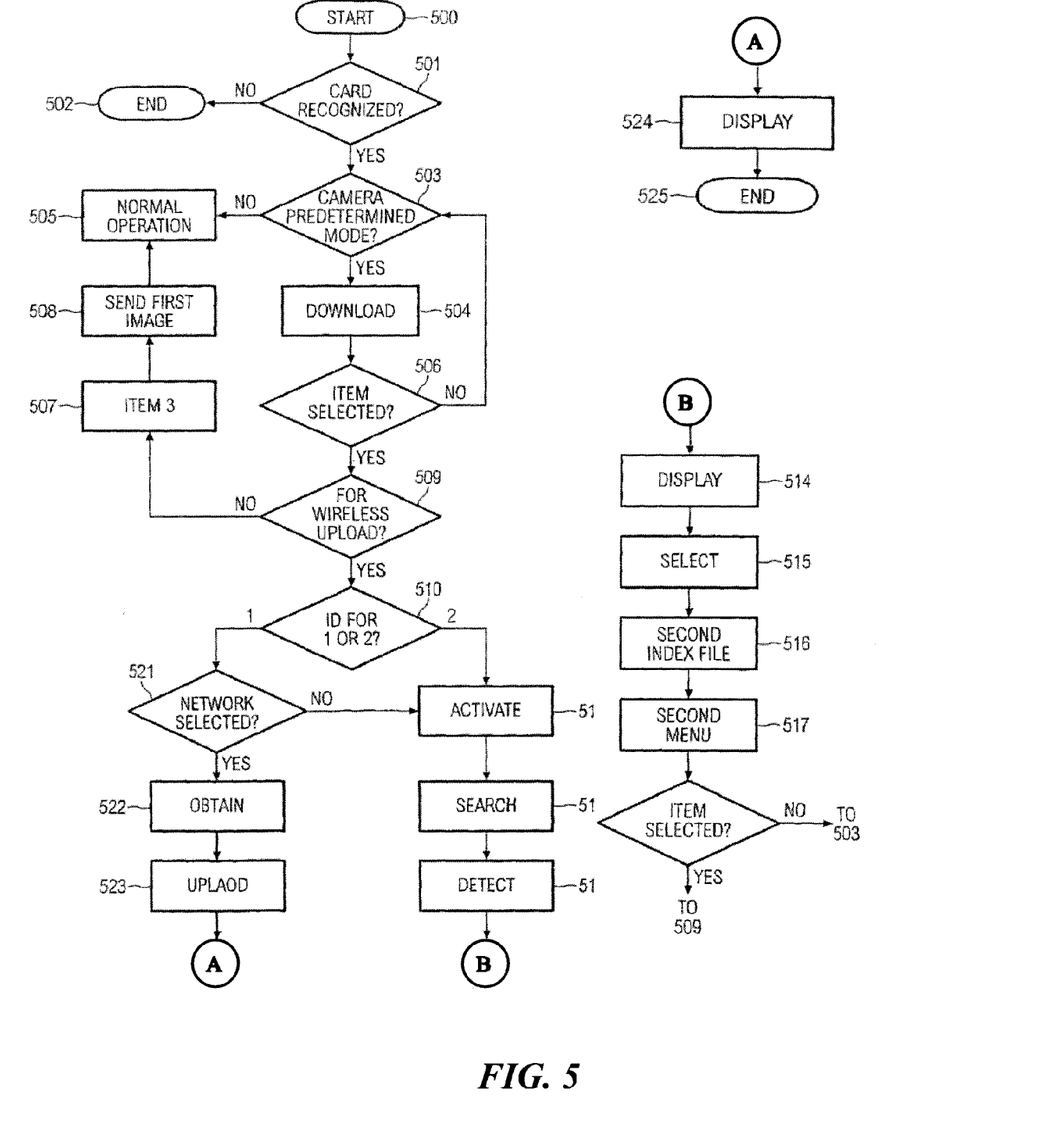
FIG. 5 is a flow chart for the operation of the exemplary embodiment of FIGS. 1 to 4.

Due to the card interface 208, whenever memory card 200 is engaged in the slot 102 of the camera 100 (500), the card interface 106 sees the memory card 200 as a normal memory card and will interface with it in the usual manner for transferring image and/or audio data from the inbuilt processor 104 to the memory card 200 (501). If the card 200 is not of a category recognised by the camera 100, it will display an error message in the normal manner and the process ends (502).

Once the initial connection between the inbuilt processor 104 and the card 200 is concluded, and upon the camera control being set to a predetermined mode such as, for example, "view" (or its equivalent such as, for example, "play" or "display" or "transfer data") (503), the inbuilt processor 104 downloads from card 200 the first image file for display on the display 110 in accordance with normal operations. The central processor 202 then sends to the display interface 108 an index image file containing a first menu (504), with the navigation controls of controls 114 being able to be used in the normal manner for controlling the displayed menu. The first menu will contain a series of first items for determining the future performance of the camera 100. Each of the items of the first menu is a separate, image within the index image file. The first menu items may include, for example:

1. transfer data
2. wireless detect
3. view image.

If at (503) the camera 100 is not set to the predetermined mode—"view" or its equivalent—the memory card 200 and the inbuilt processor 104 operate in the normal, known manner (505) under the operation of the inbuilt processor 104.

If the camera 100 is set to the predetermined mode, one of the displayed items must then be selected (506). As each item in the menu is a separate image, selecting one item in the menu list is selecting a separate image. Therefore, the controls 114 used must be such that the processor 104 can send an instruction to the central processor 202. There are normally two such instructions when in the view mode—"next" (send next image) and "delete" (delete this image). As "next" is required for the following operations, the "delete" function can be used. However, when the camera 100 is in the "view" mode AND if either "transfer data" or "wireless detect" is selected from the first menu items given above, the central processor 202 will interpret "delete" as "select". When the "send first image" instruction is sent by the processor 104 and is received by memory card central processor 202 (504), the central processor 202 recognizes that the camera 100 is in the "view" mode as this is the only time such an instruction is received.

As each of the first menu items is a separate image, by using "delete" not only is an instruction sent from processor 104 to central processor 202, but the instruction contains an identifier of the image to enable the central processor 202 to know which image is to be deleted.

The central process 202 receives the instruction and, after confirming that the predetermined mode has been selected AND that the image selected is either (1) or (2) from the image index file, the central processor 202 treats the "delete" instruction as "select".

The central processor 202 will then take the necessary action depending on whether first menu item 1 or first menu item 2 was selected.

A query is raised (509) to determine if the first menu item selected is for wireless transfer. If not, it must be item 3. If item 3 is selected in the normal manner using controls 114 (507), the central processor 202 will treat the instruction in the normal manner and send the first image file from the storage module 206 (508) and the camera 100 and memory card 200 will continue to operate in the normal manner (505). If at (509) the first menu item selected is for wireless transfer, it could be item 1 or item 2. So a second query is raised (510) to determine if item 1 or item 2 was selected.

If at 510 item 2 was selected, the central processor 202 will activate the wireless transceiver module 204 (511) and a search will be undertaken for potential wireless networks to which the card 200 can be connected (512). This will be in the normal manner. Once all potential wireless networks are detected (513) they are displayed on the display 110 (514) and the controls 114 are used to select the desired wireless network (515). Upon the desired wireless network being selected a second index image file is downloaded from the central processor 202 to the display 110 (516). The second index image file contains a second menu list (517). The second index image file may be the same as the first index image file, or may be different. Each of the second menu list is also a separate image and has its own identifier. The second menu list may be the same as the first menu list, or may be different. The second menu list may include items such as, for example:

1. transfer data
2. wireless detect
3. view image

If at (510) item 1 is selected from the first menu list, the central processor 202 will determine if a wireless network has previously been selected (521). If not, it will revert to item 2 (510) and commence the search for potential wireless networks, as is described above. If a wireless network has previously been selected, the central processor 202 sequentially obtains the image data for the various image files (522) and, using the wireless transceiver module 204, uploads the image data to the selected, pre-determined web site (523). Upon uploading completing, a "completion" message may be displayed on display 110 (524) then the process ends (525).

If item 1 is selected from the second menu list at (518) and as the pre-determined web site is known and the network has just been selected, the central processor 202 will commence to download all the image files from the storage module 206 and transfer them to the wireless transceiver module 204 for wireless uploading of the image data to a pre-determined web site. If there is more than one pre-determined web site, the central processor 202 will send a list of the pre-determined web sites for display on the display 110 and, after one has been selected in the normal manner, will use the selected, pre-determined web site as that to which the image data is to be sent. The list of pre-determined web sites may be by their URL, or by a previously-entered abbreviated name and may include an email account at a web site.

The entry of the pre-determined web site is by previously operatively connecting the memory card 200 to a computer (not shown). The computer will upload the necessary interface from the central processor 202 and the computer will be used to enter the URL of the desired web site or web sites, or the email account, which is then stored in the storage module 206 of the memory card 200.

Figure 2:
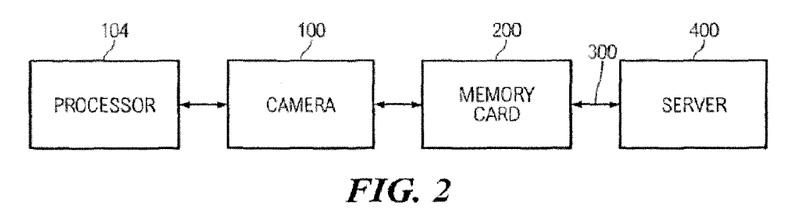
FIG. 2 is a block diagram illustrating the exemplary system of FIG. 1.

As such, when the camera 100 has been used to capture images that are stored in the storage module 206 of the memory card 200 in the normal manner, upon the camera controls 114 being set to the predetermined mode such as view, the procedure described above will commence. When in the camera 100 is in the predetermined mode, the central processor 202 and the wireless transceiver module 204 will then operate to send the image data to the selected, pre-determined web site over the Internet 300 so the images can be stored in the storage 402 of the server/PC or other computer 400. This may be done at a convenient time such as, for example, overnight when the camera 100 would normally not be in use. In addition, when the camera 100 is in the predetermined mode it may be used to download the image data from the selected, predetermined web site over the Internet 300 to enable the images to be stored in the storage module 206. This may be required if the images had previously been deleted from the storage module 206.

If desired or required, when the uploading of all the image data is completed, the central processor 202 may compress or downsize the image data as stored in the storage module 206. Compression may be by any known and/or suitable compression application.

Downsizing may be to downsize the images to, for example, thumbnail size. Compression and/or reduction are used to reduce the amount of memory in storage module 206 that is required to store the image data. Any compressed and/or reduced images will be noted and not resent to the pre-selected web site. Furthermore, any images that are sent to the pre-selected web site may be flagged as having been sent, and may not be resent in the future. However, the central processor 202 may send a prompt to the display 110 asking if old images are to be sent again, or only new, and previously unsent, images. Appropriate action will be taken by central processor 202 after the selection is made in the manner described above.

Figure 6:
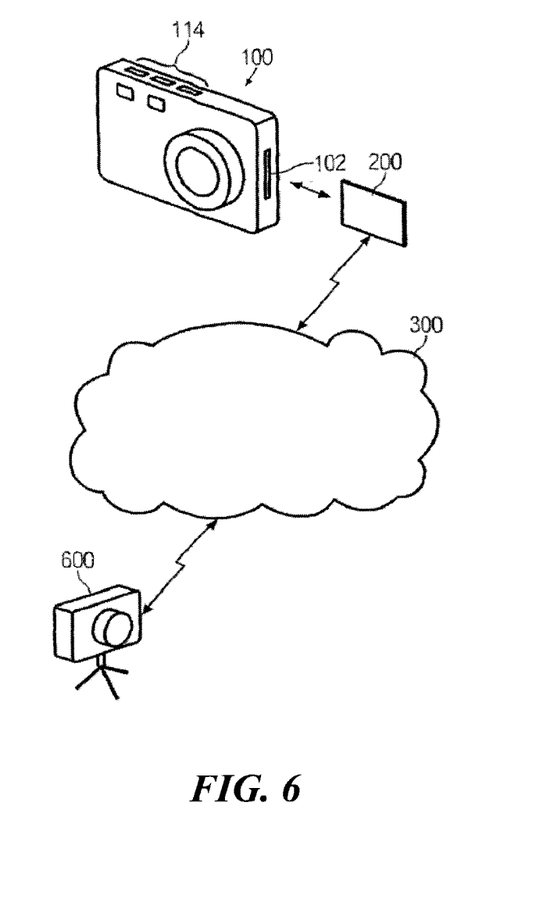
FIG. 6 is a schematic view of an exemplary system of a wireless media connectable to a host device to enable data to be wirelessly received by the host device from an external source.

In FIG. 6 there is shown a second exemplary embodiment where the wireless transceiver module 204 is used to wirelessly receive digital data from an external source 600. In this exemplary embodiment the external source is a remote camera 600, such as, for example, a security camera that is used for capturing images or video. However, it may be, for example, a camera similar to the portable digital camera 100 so that sharing of images or video may take place on a camera-to-camera basis. The remote camera 600 may have image, video and/or audio capturing capability. It should have a wireless module capable of wireless communication by at least one relevant and appropriate standard such as, for example, Wi-Fi or Bluetooth. The remote camera 600 has wireless capability for transmitting image or video data (including audio) over the network 300 to the wireless module 204, or directly to the wireless module 204. This may be by use of WiFi, the Internet, Bluetooth, or otherwise as required.

With reference to FIG. 5, if the digital camera 100 is in the predetermined mode at 503 there may be a further query by a further menu item to determine if the memory card 200 is to be used to upload digital data captured by the digital camera 100, or is to be used to receive digital data from the remote camera 600. If it is upload, the digital camera 100 operates as described above. If it is to receive, the digital camera 100 is used to receive and display the digital data sent by the remote camera 600. The digital data received by the digital camera 100 from the remote camera 600 may also be stored in the storage module 206.

In this way the digital data captured by the remote camera 600 can be displayed and/or stored by the digital camera 100. In that way if the remote camera 600 is a security camera and it detects an intrusion, it can be viewed on the digital camera 100 as long as the digital camera 100 is able to wirelessly receive the digital data. Appropriate action can then be taken. The security camera 600 may be of any suitable nature or form with the only requirement being a capability of wireless transmission. The wireless transmission module may be integral with the security camera 600 or may be a separate component, the security camera 600 and the separate component being operatively connected.

If the remote camera 600 is a camera similar to the digital camera 100 with a memory card 200, file sharing can take place on a camera-to-camera basis without the need for email, websites or other removable storage devices. However, it may be over the Internet or any other network if required or desired.

As can be seen, for both exemplary embodiments the memory card 200 will be able to connect to the host device 100 without any driver installation or modification of the software running on the host device 100 and is thus "plug-and-play".

The memory card 200 may include a digital rights management module for copyright protection of content downloaded to the memory card 200 storage module 206.

Furthermore, when in the predetermined mode the central processor 202 may over-ride any auto-off or auto-shut-down of the camera 100 to enable the camera 100 to continue to operate until it is taken out of the predetermined mode.

Whilst the foregoing description has described exemplary embodiments, it will be understood by those skilled in the technology concerned that many variations in details of design, construction and/or operation may be made without departing from the present invention.

The invention claimed is:

1. A memory card configured to be physically and operably engaged in a digital camera, the digital camera comprising an inbuilt processor incapable of independently wirelessly exporting digital data externally of the digital camera or independently wirelessly importing digital data from externally of the digital camera, the memory card comprising:
  a wireless transceiver module,
  a central processor, and
  a storage module;
  wherein the wireless transceiver module is configured to receive the digital data transmitted to the digital camera and to export the digital data from the storage module;
  wherein the central processor is configured to control at least one of:
    the reception of the digital data by the digital camera, and
    the transmission of the digital data from the digital camera when the digital data is captured by the digital camera;
  wherein the storage module is operably connected to the central processor and configured to store, at least one of:
    the digital data captured by the digital camera, and the digital data received by the digital camera;
  wherein when the digital camera is in a predetermined mode, the central processor is further configured to send a first index image file to the inbuilt processor for display of the first index image file on a screen of the digital camera, the first index image providing a first menu by presenting a plurality of images, each of the plurality of images representing a first menu item tor selection by a user and each of die plurality of images is a separate image within the first index image file;
  wherein one of the first menu items when selected using a control button of the digital camera, controls the inbuilt processor of the digital camera to export the digital data to a remote camera through the wireless transceiver module, wherein the exporting of the digital data can only take place when the digital camera is in the predetermined mode;
  wherein another one of the first menu items when selected using a control button of the digital camera, controls the inbuilt processor of the digital camera to receive the digital data from the remote camera through the wireless transceiver module, wherein the reception of the data can only take place when the digital camera is in the predetermined mode;
  wherein when the digital camera is in the predetermined mode, the central processor is adapted to override any auto-off or auto-shutdown of the digital camera to enable the exporting and reception of digital data to continue to operate;
  wherein another one of the first menu items when selected using a control button of the digital camera, controls the central processor to wirelessly upload the digital data from the storage module to a predetermined website, wherein an address for the predetermined website is stored in the storage module by previously operatively connecting the memory card to a computer different than the digital camera and using the computer to enter a URL of the predetermined website; and
  wherein the storage module is configured to store a list of predetermined websites from which the user selects the predetermined website based on display of the list of predetermined websites using the digital camera, the list of predetermined websites comprising the URL of the predetermined website and an email account;

whereby the memory card is capable of connecting to the digital camera and providing the first menu items without any driver installation or modification of the software running on the digital camera.

2. The memory card as claimed in claim 1, wherein the memory card is configured to detect potential wireless networks to which the memory card can be connected.

3. The memory card as claimed in claim 1, wherein the digital data is selected from the group consisting of: image data, audio data, image and audio data, video data, and audio and video data.

4. The memory card as claimed in claim 1, wherein the memory card comprises at least one address to which the central processor and the wireless transceiver, module are to send the digital data or from which the central processor and the wireless transceiver module are to receive the digital data.

5. The memory card as claimed in claim 1, wherein the digital camera is selected from the group consisting of: a digital camera, a digital video camera, a digital voice recorder, and a digital diary.

6. A method for exporting digital data from and receiving digital data by a digital camera, the digital camera comprising an inbuilt processor incapable of independently wirelessly exporting digital data externally of the digital camera or independently wirelessly importing digital data from externally of the digital camera, the method comprising:

selecting a predetermined mode of the digital camera;

when the digital camera is in the predetermined mode, sending a first index image file to the digital camera from a memory card installed in and operatively connected to the digital camera, the memory card comprising a central processor, a storage module and a wireless transceiver module, the first index image tile providing a first menu by presenting a plurality of images, each of the plurality of images representing a first menu item for selection by a user and each of the plurality of images is a separate image within the first index image file;

selecting one of the first menu items comprising a plurality of first menu items with each of the first menu items comprising an image; using a control of the digital camera, to control the inbuilt processor of the digital camera to accordingly instruct the central processor of the memory card as to whether to export the digital data from the memory card to a remote camera through the wireless transceiver module, wherein the exporting of the digital data can only take place when the digital camera is in the predetermined mode;

selecting one of the first menu items using a control button of the digital camera, to control the inbuilt processor of the digital camera to receive the digital data from the remote camera through the wireless transceiver module, wherein the reception of the digital data can only take place when the digital camera is in the predetermined mode, and wherein when the digital camera is in the predetermined mode, the central processor is adapted to override any auto-off or auto-shutdown of the digital camera to enable the exporting and reception of the digital data to continue to operate; and selecting one of the first menu items using a control button of the digital camera to control the central processor to wirelessly upload the digital data from the storage module to a predetermined website, wherein an address for the predetermined website is stored in the storage module by previously operatively connecting the memory card to a computer different than the digital camera and using, the computer to enter a URI, of the predetermined website;

wherein the predetermined website is selected by the user from a list of predetermined websites displayed using the digital camera, the list of predetermined websites comprising the URL of the predetermined website and an email account;

whereby the memory card is capable of connecting to the digital camera and providing the first menu items without any driver installation or modification of the software running on the digital camera.

7. The method as claimed in claim 6, wherein the control of the digital camera is able to be used to control the central processor only when the digital camera is in the predetermined mode.

8. The method as claimed in claim 6, wherein the first index image file is displayed on a screen of the digital camera.

9. The method as claimed in claim 6, wherein the remote camera is another digital camera comprising another memory card with wireless transmission capability.

10. The method as claimed in claim 6, wherein the remote camera is a security camera.

11. The method as claimed in claim 6, wherein when the control is used to select one of the first menu items, the inbuilt processor is configured to send an instruction to the central processor, the instruction comprising an identifier of the one menu items.

12. The method as claimed in claim 6, wherein when the digital camera is in the predetermined mode and the first menu item selected is relevant for the wireless export or import of the digital data from the memory card to the remote camera, the inbuilt processor sends an instruction to the central processor and the central processor is configured to treat the instruction as "select".

13. The method as claimed in claim 12, wherein the instruction is "delete".

14. A method for exporting data from or receiving digital data by a digital camera, the digital camera comprising an inbuilt processor incapable of independently exporting data externally of the digital camera or importing digital data from externally of the digital camera, the method comprising:

selecting a predetermined mode of the digital camera;

when the digital camera is in the predetermined mode, sending a first index image tile from a central processor of a memory card to the digital camera, the first index image file providing a first menu by presenting a plurality of images, each of the plurality of images representing a first menu item for selection by a user and each of the plurality of images is a separate image within the first index image file;

using a control of the digital camera to select one of the first menu items;

when an appropriate first menu item is selected, the inbuilt processor is configured to instruct the central processor and a wireless transceiver module to wirelessly export the digital data from the digital camera or to wirelessly import the digital data to the digital camera, wherein the exporting and importing of the digital data can only take place when the digital camera is in the predetermined mode, and Wherein when the digital camera is in the predetermined mode, the central processor is adapted to override any auto-off or auto-shutdown of the digital camera to enable the exporting and importing of digital data to continue to operate;

the central processor wirelessly uploading the digital data from a storage module of the memory card to a predetermined website when another appropriate first menu item is selected, wherein an address for the predetermined website is stored in the storage module by previously operatively connecting the memory card to a computer different than the digital camera and using the computer to enter a URI, of the predetermined website; and wherein the predetermined website is selected by the user front a list of predetermined websites displayed using the digital camera, the list of predetermined websites comprising the of the predetermined website and an email account.

15. The method as claimed in claim 14, wherein the digital camera is used to capture digital data and store the digital data in a memory card installed in and operatively connected to the digital camera, the memory card comprising the central processor, a memory module and the wireless transceiver module.

* * * * *